United States Patent [19]

Fujishima

[11] Patent Number: 5,513,109
[45] Date of Patent: Apr. 30, 1996

[54] AIR BAG SYSTEM HAVING A CONTROL SYSTEM FOR DETERMINING THE EXACT INFLATING TIME OF AN AIR BAG

[75] Inventor: Hiromichi Fujishima, Toyota, Japan

[73] Assignee: Toyota Jidosha Kabushiki Kaisha, Toyota, Japan

[21] Appl. No.: 415,204

[22] Filed: Mar. 31, 1995

Related U.S. Application Data

[63] Continuation of Ser. No. 19,442, Feb. 18, 1993, abandoned.

[30] Foreign Application Priority Data

Jun. 22, 1992 [JP] Japan .................................. 4-163125

[51] Int. Cl.[6] .................................................. B60R 21/32
[52] U.S. Cl. .................. 364/424.05; 180/274; 280/735; 307/10.1; 340/436; 340/438
[58] Field of Search ...................... 364/424.05; 280/734, 280/735; 180/274, 282; 307/10.1; 340/436, 438, 667

[56] References Cited

U.S. PATENT DOCUMENTS

| | | | |
|---|---|---|---|
| 4,975,850 | 12/1990 | Diller | 180/274 |
| 4,985,835 | 1/1991 | Sterler et al. | 364/424.05 |
| 5,189,311 | 2/1993 | Moriyama et al. | 307/10.1 |
| 5,208,484 | 5/1993 | Okano et al. | 280/735 |
| 5,225,985 | 7/1993 | Okano | 280/735 |
| 5,229,943 | 7/1993 | Eigler et al. | 180/282 |
| 5,261,506 | 11/1993 | Jost | 280/735 |

FOREIGN PATENT DOCUMENTS

| | | |
|---|---|---|
| 114944 | 5/1991 | Japan . |
| 208751 | 9/1991 | Japan . |
| 220044 | 9/1991 | Japan . |

Primary Examiner—Gary Chin
Attorney, Agent, or Firm—Cushman Darby & Cushman

[57] ABSTRACT

An air bag system able to inflate an air bag at an appropriate time, corresponding to different collision modes, with a simplified construction. The system is provided with a longitudinal acceleration sensor and an acceleration level computing means which computes the degree of acceleration. A computing device computes the rate of change of the acceleration and detects a characteristic of the rate of change, and sends the resultant data to a first judging device. The first judging device detects the presence of a collision based on the degree of the acceleration and the characteristic of the rate of change of the acceleration. A second judging device is provided in order to detect the presence of a collision based on the acceleration. An air bag driving signal is output based on the judgments made by the first and the second judging device.

15 Claims, 15 Drawing Sheets

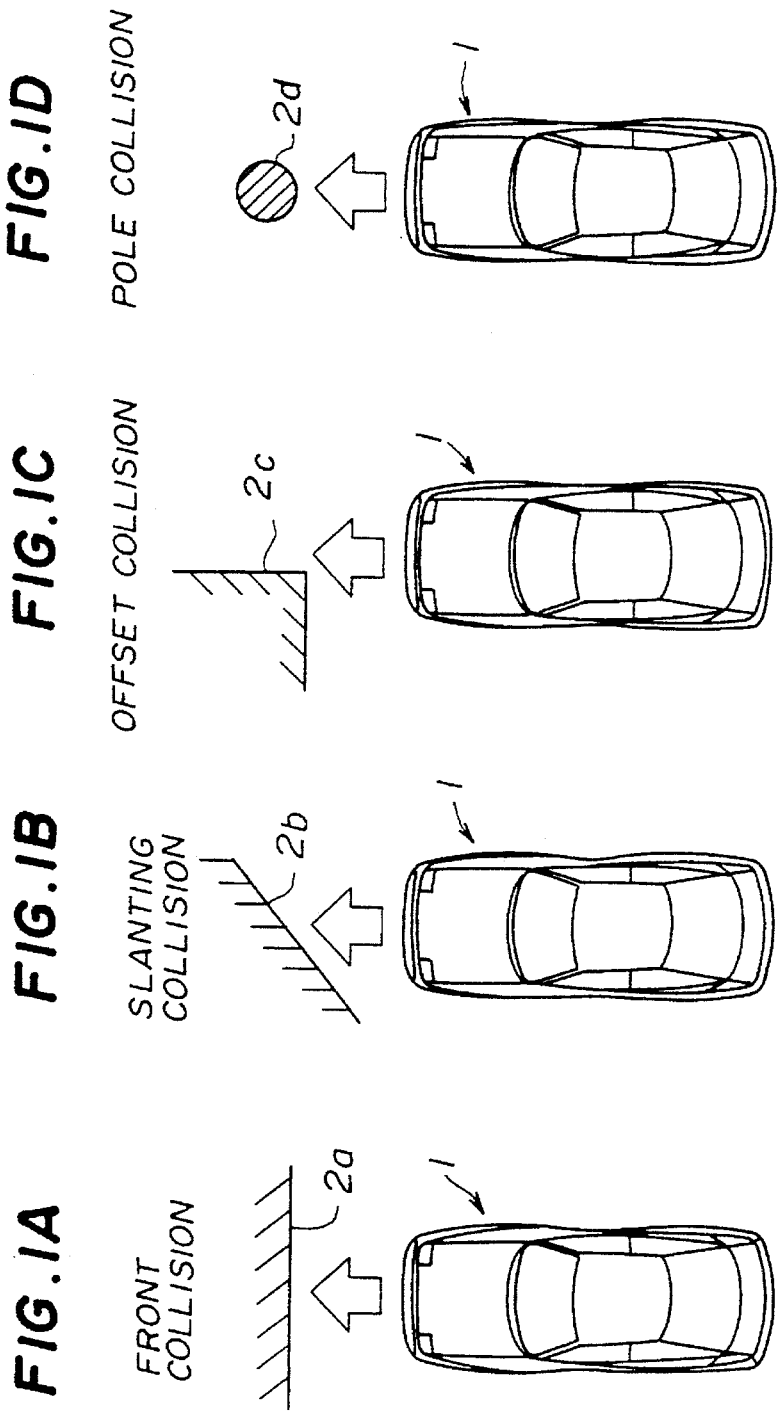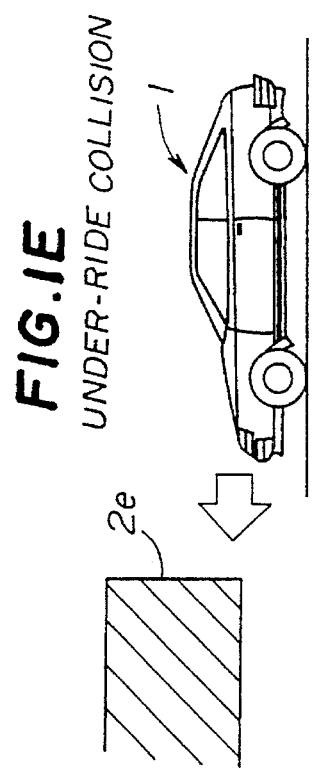

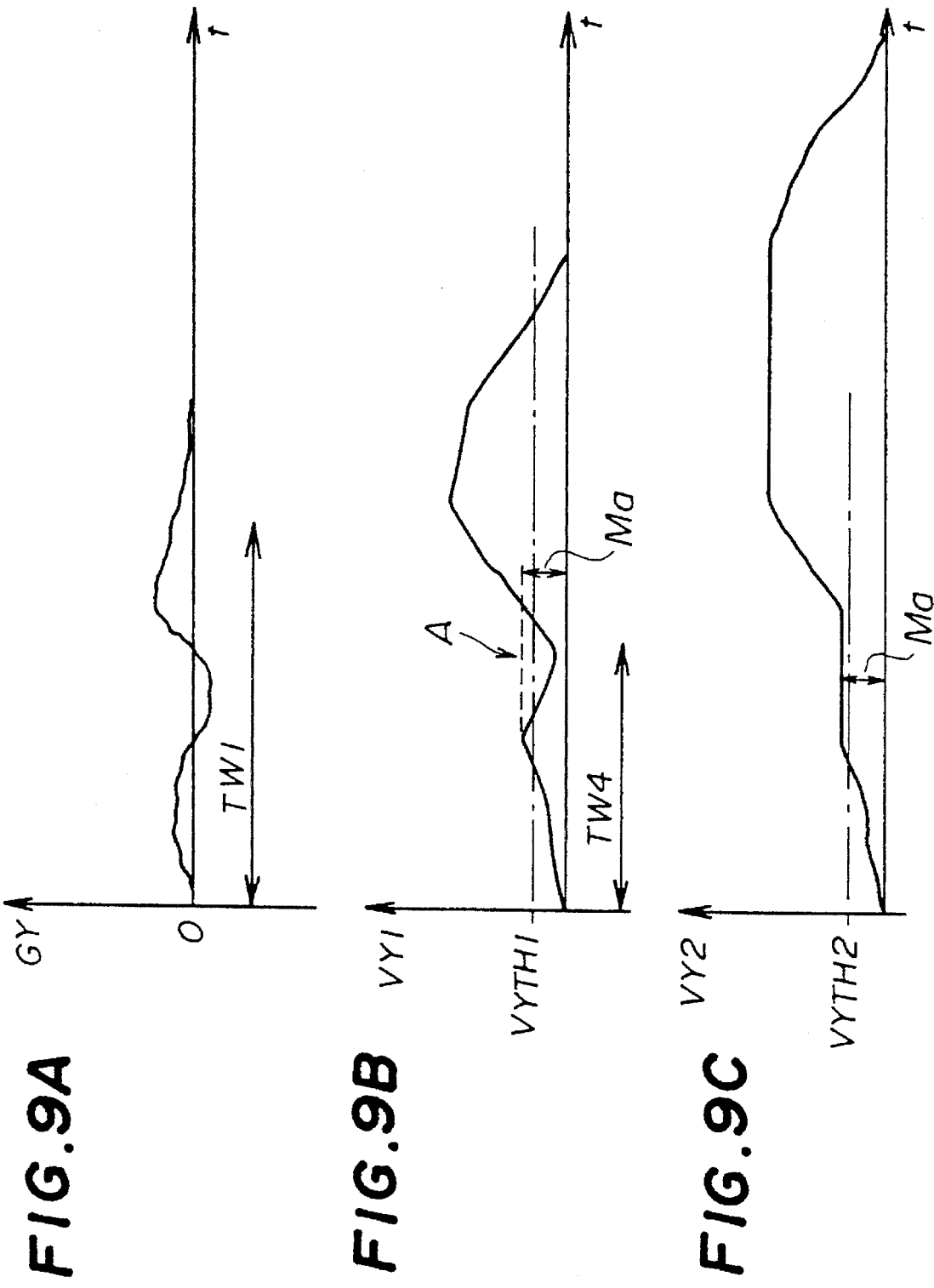

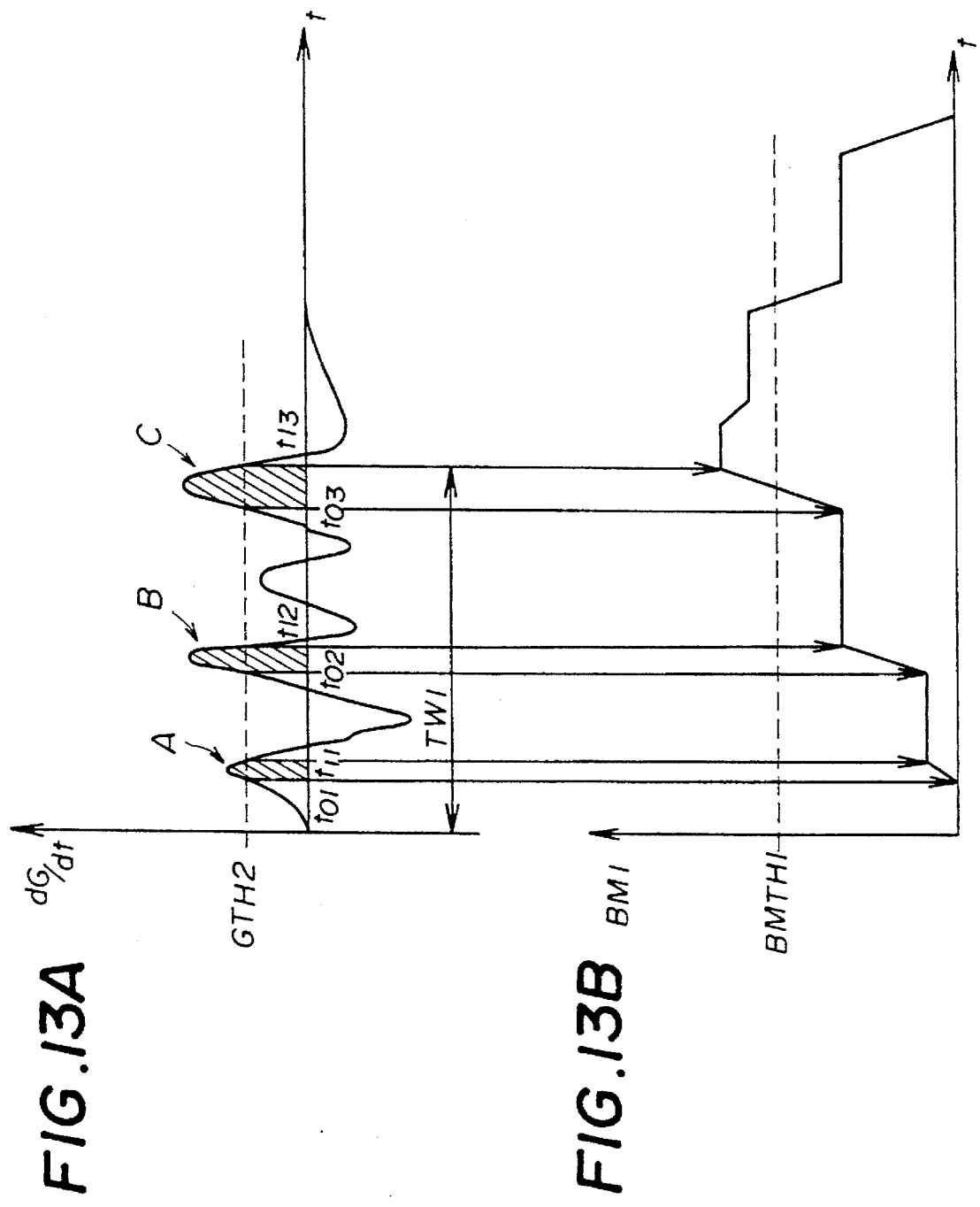

AIR BAG SYSTEM HAVING A CONTROL SYSTEM FOR DETERMINING THE EXACT INFLATING TIME OF AN AIR BAG

This is a continuation of application Ser. No. 08/019,442, filed on Feb. 18, 1993, which was abandoned.

BACKGROUND OF THE INVENTION (1) Field of the Invention

The present invention generally relates to an air bag system, and more particularly to an air bag system in which the inflating time of an air bag is determined based on an acceleration signal supplied by an acceleration sensor.

(2) Description of the Related Art

An air bag system inflates an air bag at a position between the driver and the steering wheel when the automobile collides with an object. The driver is protected from the shock of the collision by the absorption of the energy of motion of the driver by the air bag. The air bag system comprises an air bag driving mechanism and an air bag control system. The air bag driving mechanism is a mechanism which inflates an air bag. The air bag control system detects the automobile collision and judges whether or not inflation of an air bag is needed. If it is judged that inflation of the air bag is needed, the air bag control system controls the air bag driving mechanism to inflate the air bag at an appropriate time.

As a conventional air bag control system, there is disclosed an air bag system, for example, in the Japanese Laid-Open Patent Application No. 3-114944. The air bag system disclosed in the above application takes advantage of the difference of shock forces between a light collision and a pole collision and appropriately inflates the air bag by recognizing the mode of collision on the basis of the difference of shock forces.

Specifically, automobile speed information B is obtained by integrating an acceleration signal G supplied by an acceleration sensor, and a collision mode information value E is obtained by the difference between the maximum value $G_{MAX}$ and the minimum $G_{MIN}$ of the acceleration signal G in a predetermined period of time. Based on this information, a judging information value F is calculated by the following equation.

$$F = B + H*E \quad (H: \text{predetermined factor})$$

When the judging information value F obtained by the above equation is greater than, a predetermined threshold value K, it is judged that the collision is a pole collision (as will be explained in the following) and the air bag is inflated. On the other hand, if the judging information value F is less than the threshold value K, it is judged that the collision is a light collision and the air bag is not inflated.

Now, a description will be given of the collision modes with reference to FIG. 1A to FIG. 1E. FIG. 1A shows a front collision where an automobile 1 collides with an object 2a having a surface normal to the automobile direction of travel. FIG. 1B shows a slanting collision where the automobile 1 collides with an object 2b having a surface at an angle to the automobile direction of travel. FIG. 1C shows an offset collision where the automobile 1 collides with an object 2c offset from the automobile 1. FIG. 1D shows a pole collision where tile automobile 1 collides with a cylindrical object 2d such as a pole. FIG. 1e shows an under-ride collision where the automobile 1 collides with an object 2e positioned above the front bumper of the automobile 1.

As described above, there are various modes of collision. Accordingly, an acceleration signal output from the acceleration sensor varies depending on the mode of collision. The conventional air bag control system mentioned above has a problem in that although a determination of the pole collision and the light collision can be performed, other collision modes cannot be recognized.

If the collision mode cannot be recognized, there is a possibility that a driving signal is sent from the air bag control system to the air bag driving mechanism when it is not needed. Additionally, there is a possibility that the air bag is not inflated at an appropriate time because a driving signal is not sent at to the air bag driving mechanism at the time when it is needed.

Because of the structure of the conventional air bag control system, only two collision modes can be recognized by a single acceleration sensor. Accordingly, when recognizing all of the above mentioned collision modes, a plurality of sensors are needed. However, increasing the number of sensors results in an increase in manufacturing costs. Additionally, both hardware and software for a computer which processes signals supplied by each sensor becomes complex, and thus the cost of the system is further increased.

SUMMARY OF THE INVENTION

It is a general object of the present invention to provide an improved and useful air bag system which eliminates the above mentioned disadvantages.

A more specific object of the present invention is to provide an air bag system which can inflate an air bag at an appropriate timing corresponding to the collision mode.

Another object of the present invention is to provide an air bag control system which can recognize a collision mode by analyzing an acceleration signal from an acceleration sensor, which signal shows a characteristic property.

In order to achieve the above mentioned objects, an air bag system according to the present invention comprises:

an air bag driving apparatus including an air bag and means for inflating the air bag upon receipt of an air bag driving signal; and an air bag control system comprising, a first acceleration sensor which detects the acceleration of the body of an automobile in a longitudinal direction and outputs a first acceleration signal, an acceleration level computing means, coupled to the first acceleration sensor, for computing the degree of acceleration and a longitudinal post-collision speed by using the first acceleration signal, a rate of change computing means, coupled to the first acceleration sensor, for computing the rate of change of the first acceleration signal and detecting a predetermined characteristic of the rate of change, and outputting a first result, a first judging means, coupled to the acceleration level computing means and the rate of change computing means, for judging an occurrence of a collision of the automobile by using the degree of acceleration, the longitudinal post-collision speed and the first resultant data, and outputting a first judgment result, a second judging means, coupled to the acceleration level computing means, for computing the period of time during which the degree of acceleration exceeds a predetermined value for a first predetermined period of time and judging an occurrence of a collision of the automobile by using the degree of acceleration, the longitudinal post-collision speed, the rate of change and the period of time, and outputting a second judgment result, and an air bag driving signal outputting means, coupled to the first and the second judging means, for determining the occurrence of a collision of the automobile based on the first and the second judgment result and outputting the air bag driving signal to the air bag driving apparatus.

According to the present invention, the presence of a collision is judged by using the degree of an acceleration, a post-collision speed, a rate of change of the acceleration and the period of time during which the acceleration exceeding a predetermined value. The judgment is effectively performed by a plurality of judging means. Therefore, the different modes of collision can be detected by a simple system with high accuracy and the driving signal for the air bag can be output at an appropriate timing.

Other objects, features and advantages of the present invention will become more apparent from the detailed description when read in conjunction with the accompanying drawings.

BRIEF DESCRIPTION OF THE DRAWINGS

FIG. 1A shows a front collision; FIG. 1B shows a slanting collision; FIG. 1C shows an offset collision; FIG. 1D shows a pole collision; and FIG. 1E shows an under-ride collision;

FIG. 9A is a graph showing the acceleration GY output from a transverse acceleration sensor in a condition where a transverse movement of an automobile occurs; FIG. 9B is a graph showing a transverse post-collision speed $VY_1$ in a condition where a transverse acceleration shows a fluctuation shown in FIG. 9A; FIG. 9C is a graph showing a transverse post-collision speed $VY_2$;

FIG. 13A is a graph showing the rate of change of a longitudinal acceleration; FIG. 13B is a graph showing the scale of collision in a condition where the rate of change shows a characteristic shown in FIG. 13A;

FIG. 15 is a graph showing the rate of change of a longitudinal acceleration.

DETAILED DESCRIPTION OF THE PREFERRED EMBODIMENTS

Figure 2:
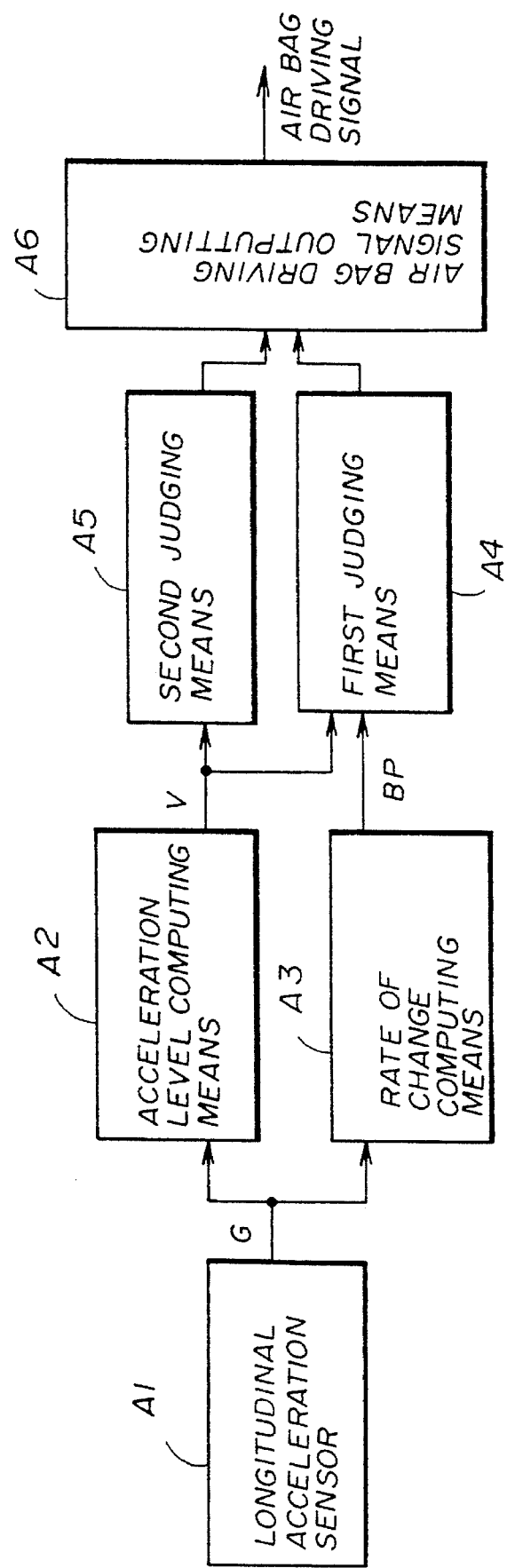
FIG. 2 is a block diagram of an air bag control system according to the present invention.

First, a description will be given of the principle of the present invention with reference to FIG. 2. FIG. 2 is a block diagram of a first principle of an air bag control system according to the present invention.

The air bag control system according to the present invention comprises; a longitudinal acceleration sensor A1, an acceleration level computing means A2, a rate of change computing means A3, a first judging means A4, a second judging means A5, and an air bag driving signal outputting means A6. The longitudinal acceleration sensor A1 detects the acceleration of an automobile in the longitudinal direction and sends an output signal G to the acceleration level computing means A2 and the rate of change computing means A3. The acceleration level computing means A2 computes an acceleration value V based on the output data G and sends the acceleration value V to the first and second judging means A4 and A5. The rate of change computing means A3 detects the rate of change BP of the output G and sends the rate of change BP to the first judging means A4. The first judging means judges whether or not a collision occurs based on the acceleration value V and the rate of change BP and sends the resultant data to air bag driving signal outputting means A6. The second judging means A5 computes a time T1, which is the period of time during which the acceleration value V exceeds a predetermined value, and judges whether or not a collision occurs based on the time T1 and the acceleration value V and sends the resultant data to the air bag driving signal outputting means A6. The air bag driving signal outputting means A6 determines whether or not an inflation of the air bag is needed based on the resultant data received from the first and the second judging means, and then outputs an air bag driving signal.

The rate of change BP of the output signal G is one of parameters indicating a collision mode. For example, the rate of change BP shows a violent change in the case of a front collision where the crushed portion shows a bellows-like deformation. Accordingly, it is possible to determine a type of a collision by using the rate of change BP. It should be noted that the acceleration value V is also used when determining the occurrence of a collision by the first judging means A4 so as to eliminate an unnecessary inflation of the air bag because the rate of change BP may show a violent change during driving on a rough load in which case an inflation of the air bag is not needed.

On the other hand, a collision mode can also be recognized by using the time T1. For example, the case of the slanting collision or the under-ride collision where the crash of the automobile occurs for a relatively long time without rapid deformation of the automobile body, the acceleration value V remains at a high value for certain period of time. Therefore, the time T1 is considered one of the parameters indicating the collision mode. It should be noted that the acceleration value V is also used when determining the occurrence of a collision by the second judging means A5 so as to eliminate an unnecessary inflation of the air bag because the time T1 may become long in a situation where an inflation of the air bag is not needed.

As mentioned above, the resultant data output from the first and the second judging means reflects a corresponding collision mode. Therefore, the air bag driving signal outputting means A6 outputs an air bag driving signal corresponding to the collision mode.

Figure 3:
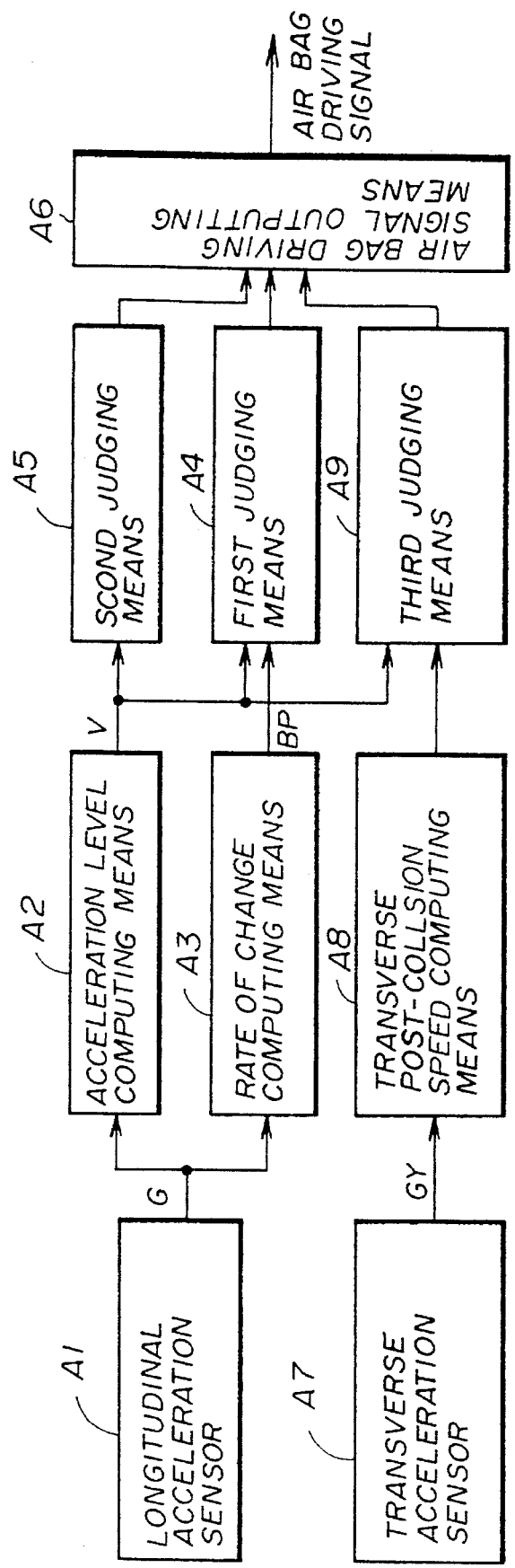
FIG. 3 is a block diagram of a second principle of the present invention.

FIG. 3 is a block diagram of a second principle of the present invention in which a further feature is added to the first principle shown in FIG. 2. In FIG. 3, those parts that are the same as ones shown in FIG. 2 are given the same reference numbers, and descriptions thereof will be omitted.

The air bag control system according to the second principle of the present invention includes a transverse acceleration sensor A7, a transverse post-collision speed computing means A8 and a third judging means A9 in addition to the system shown in FIG. 2.

The transverse acceleration sensor A7 detects an acceleration in the transverse direction of an automobile body and sends an output signal GY to the transverse post-collision speed computing means A8. The transverse post-collision speed computing means A8 computes a transverse post-collision speed VY based on the output signal GY and send the transverse post-collision speed data to the third judging means A9. The third judging means A9 determines whether or not a collision occurs based on the transverse post-collision speed VY and the acceleration value V supplied by the acceleration level computing means A2, and then sends the resultant data to the air bag driving signal outputting means A6. The air bag driving signal outputting means A6 determines whether or not an inflation of the air bag is needed based on the resultant data received from the first, the second and the third judging means, and then outputs an air bag driving signal.

According to the second principle of the present invention, a collision mode can be also recognized by the transverse post-collision speed VY. For example, in the case of the offset collision or the slanting collision, an acceleration in the transverse direction is generated in addition to an acceleration in the colliding direction. Accordingly, the transverse post-collision speed VY is considered one of the parameters indicating a collision mode. It should be noted that, similar to the above mentioned judging means, the acceleration value V is also used when determining an occurrence of a collision by the third judging means A8 so as to eliminate an unnecessary inflation of the air bag.

As mentioned above, the resultant data output from the first, the second and the third judging means reflects a corresponding collision mode. Therefore, the air bag driving signal outputting means A6 outputs an air bag driving signal corresponding accurately to the collision mode.

Next, a description will be given of an embodiment of the present invention.

Figure 4:
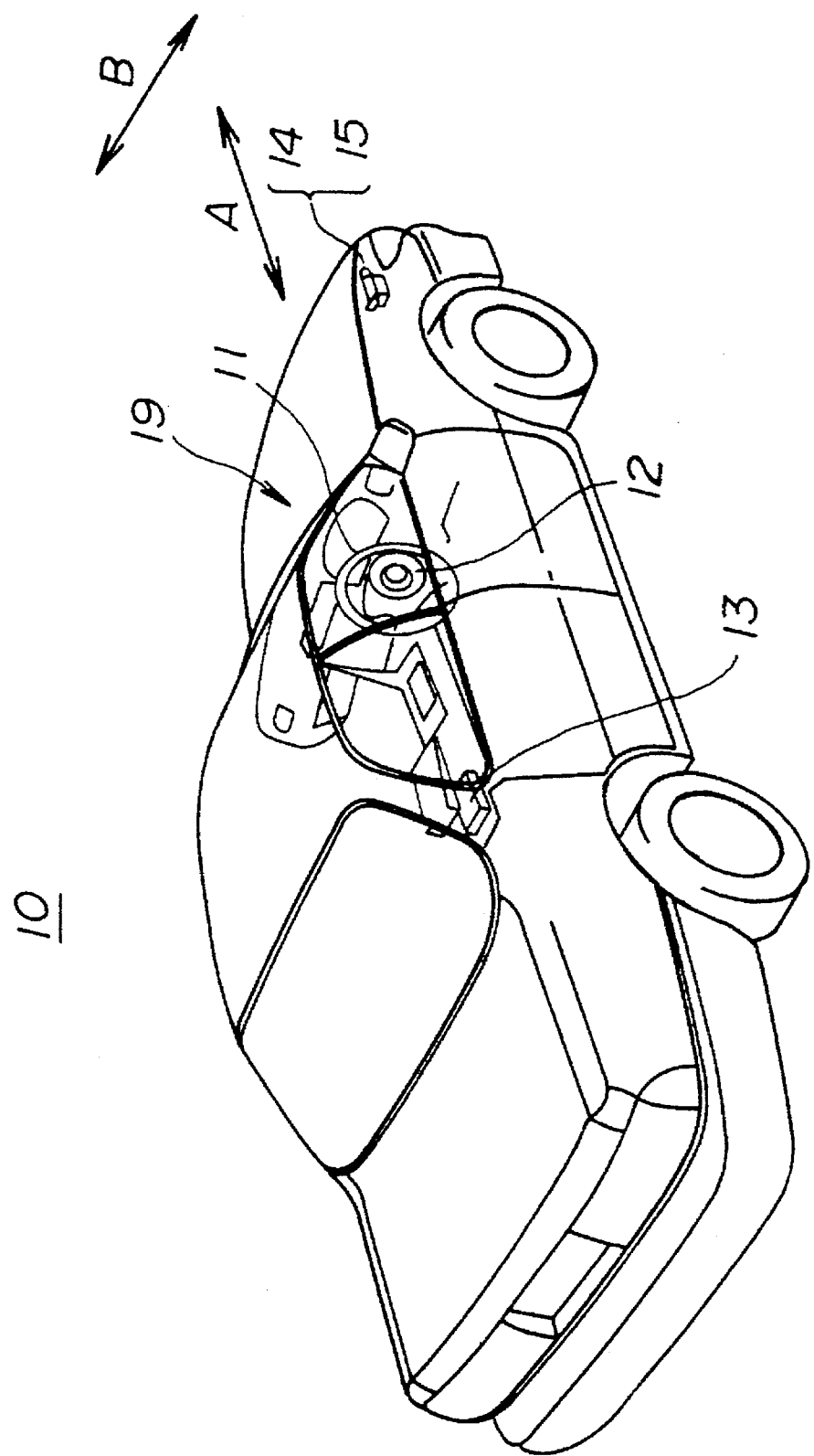
FIG. 4 is a perspective view of an example of an air bag system.

FIG. 4 is a perspective view of an example of an air bag system 10. The air bag system shown in FIG. 4 comprises an air bag driving apparatus 12 provided in the center portion of a steering wheel 11 and an air bag control system 13. The air bag control system 13 generates an air bag driving signal for operating the air bag driving apparatus in accordance with an acceleration signal G supplied by acceleration sensors 14 and 15.

Figure 5:
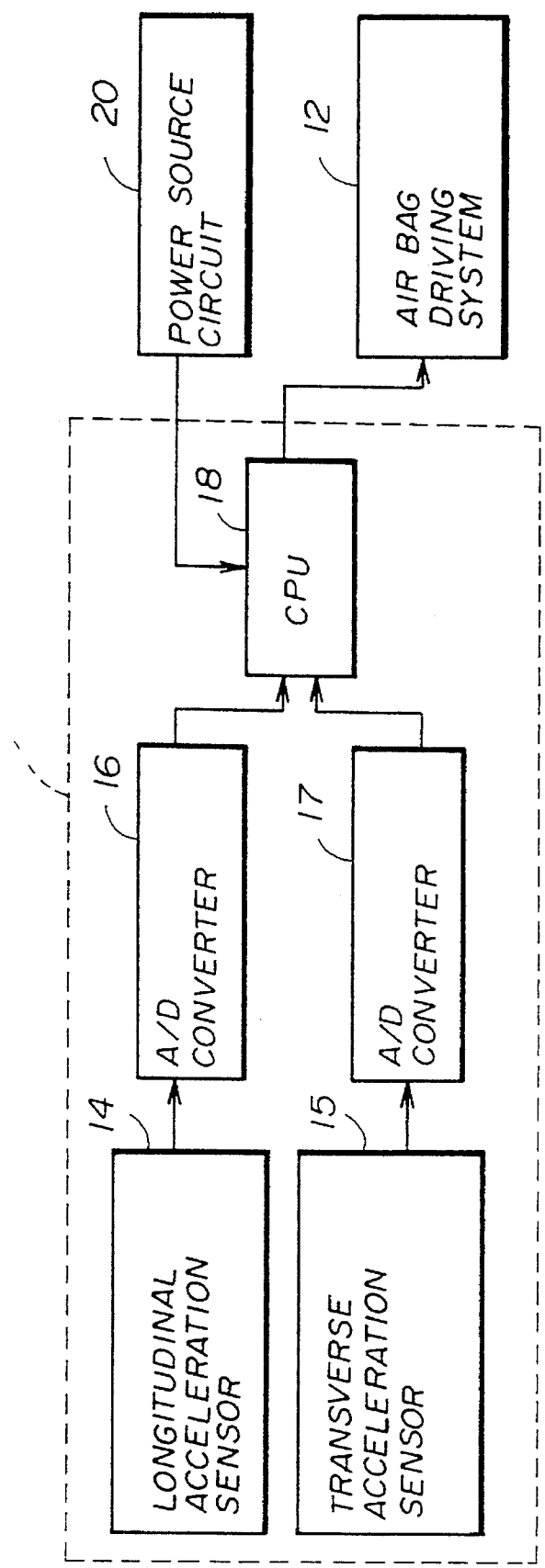
FIG. 5 is a block diagram of the air bag system shown in FIG. 4.

The air bag control system 13 comprises, as shown in FIG. 5, a longitudinal acceleration sensor 14, a transverse acceleration sensor 15, an analog/digital (A/D) converter 16, and a central processing unit (CPU) 18. The longitudinal acceleration sensor 14 detects an acceleration in the longitudinal direction indicated by an arrow A in FIG. 4 and outputs a longitudinal acceleration signal G. The transverse acceleration sensor 15 detects an acceleration in the transverse direction indicated by an arrow B in FIG. 4 and outputs a transverse acceleration signal GY.

The acceleration signals G and GY output from each acceleration sensor 14 and 15 are supplied to a CPU 18 after being digital by respective A/D converters 18 and 17. The CPU 18 is connected to a power source circuit 20 which supplies electricity to the above mentioned air bag driving apparatus. The air bag driving apparatus 12 comprises an air bag, an ignition agent, a gas generating agent and a propagation agent provided in the center portion of the steering wheel 11. When the air bag driving signal is output from the CPU 18, the ignition agent is ignited and the gas generating agent generates an amount of gas via the propagation agent and thus the air bag is inflated.

Next, a description will be given of a relationship between the acceleration signals G and GY and collision modes.

As explained with reference to FIG. 1, there are five principal modes, namely the front collision, the slanting collision, the offset collision, the pole collision and the under-ride collision. In this embodiment, The following featurization of the acceleration signals G and GY is performed in accordance with the five collision modes.

Figure 6:
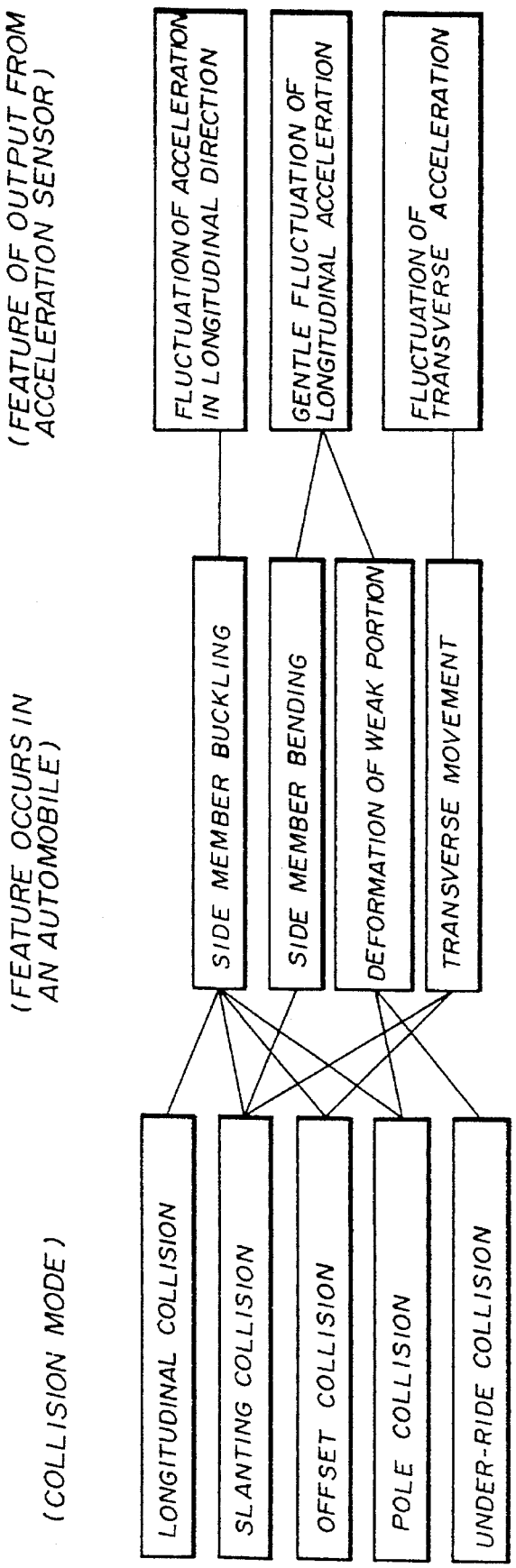
FIG. 6 is an illustration for explaining a relationship between collision modes and phenomena occurred in an automobile.

FIG. 6 is an illustration for explaining a relationship between collision modes and phenomena occurring in an automobile. The phenomena occurring in an automobile are classified into four different features, namely "side member buckling", "side member bending", "deformation of weak portion" and "transverse movement". The "side member buckling" represents the deformation of a side member of an automobile in a bellows-like shape. The "side member's bending" represents a deformation of a side member of an automobile in a shape of a bent bar. The "deformation of weak portion" represents a deformation of component parts made of soft material such as a radiator, an apron upper member or a front bumper. The "transverse movement" represents a deformation of component parts of an automobile in a transverse (left-right) direction.

As mentioned above, each of the five collision modes has one or more of the above four features. An experiment has been performed in order to investigate the output from the acceleration sensors when the above four features occur by crushing an automobile equipped with acceleration sensors, and the following results have been obtained. It should be noted that two acceleration sensors are used in order to investigate accelerations in the longitudinal direction (moving direction of the automobile) and in the transverse direction (perpendicular to the moving direction of the automobile).

Figure 7A:
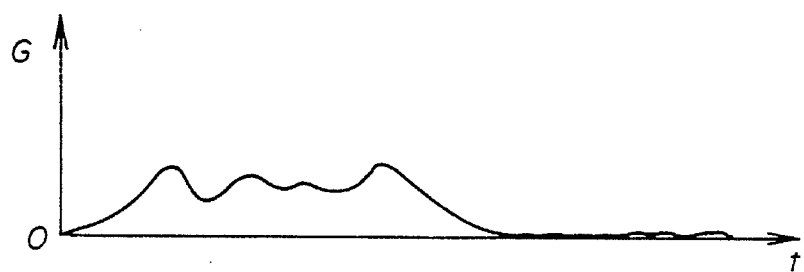
FIG. 7A is a graph showing an output from a longitudinal acceleration sensor in a condition where a buckling of side member occurs.

FIG. 7A is a graph showing an output from a longitudinal acceleration sensor in a condition where a buckling of side member occurs. As shown in the figure, the acceleration G in the longitudinal direction has a wave-like characteristic having repeated high and low peaks. It is considered that the wave-like characteristic of the acceleration G is a result of the fluctuation of acceleration which occurs at every small deformation as the buckling of side member is deforming in a bellows-like shape.

Figure 8A:
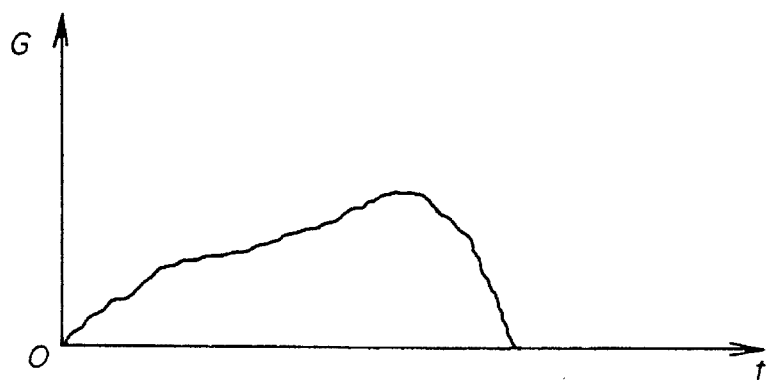
FIG. 8A is a graph showing a characteristic of a longitudinal acceleration.

In the conditions where bending of a side member or a deformation of a weak point occurs, the acceleration G output from the longitudinal acceleration sensor shows a characteristic which is similar in both case. FIG. 8A is a graph showing the acceleration G output from the longitudinal acceleration sensor in the conditions where bending of side member or deformation of a weak point occurs. As shown in the figure, in the conditions where bending of side member or a deformation of weak point occurs, unlike a buckling of side member, the longitudinal acceleration G shows a characteristic of gentle change. This is because in the condition where a side member is bent, the deforming process of the side member is not rapidly progressing but rather taking a relatively long time to be bent and thus the acceleration G shows a gentle characteristic without fluctuation. In the case of the deformation of a weak portion, the deformation process takes a relatively long time, similar to the bending of a side member, due to its elastic deformation, and the acceleration G shows a gentle characteristic without fluctuation.

FIG. 9A is a graph showing the acceleration GY output from the transverse acceleration sensor in the condition where transverse movement of an automobile occurs. In this condition, as shown in the figure, positive and negative accelerations corresponding to transverse movement of an automobile are generated.

As mentioned above, the phenomena occurring to an automobile are classified into three kinds of feature of acceleration characteristic. Accordingly, by detecting these three features and outputting an air bag driving signal based on the detected results, the air bag can be inflated at an appropriate timing for all collision modes. In this embodiment, the CPU 18 detects the above three features by using the acceleration signals G and GY, and the air bag driving signal is output based on the result of detection.

Next, a description will be given of a first embodiment of a control operation of an air bag performed by the CPU 18 with reference to FIG. 10 and FIG. 11.

Figure 10:
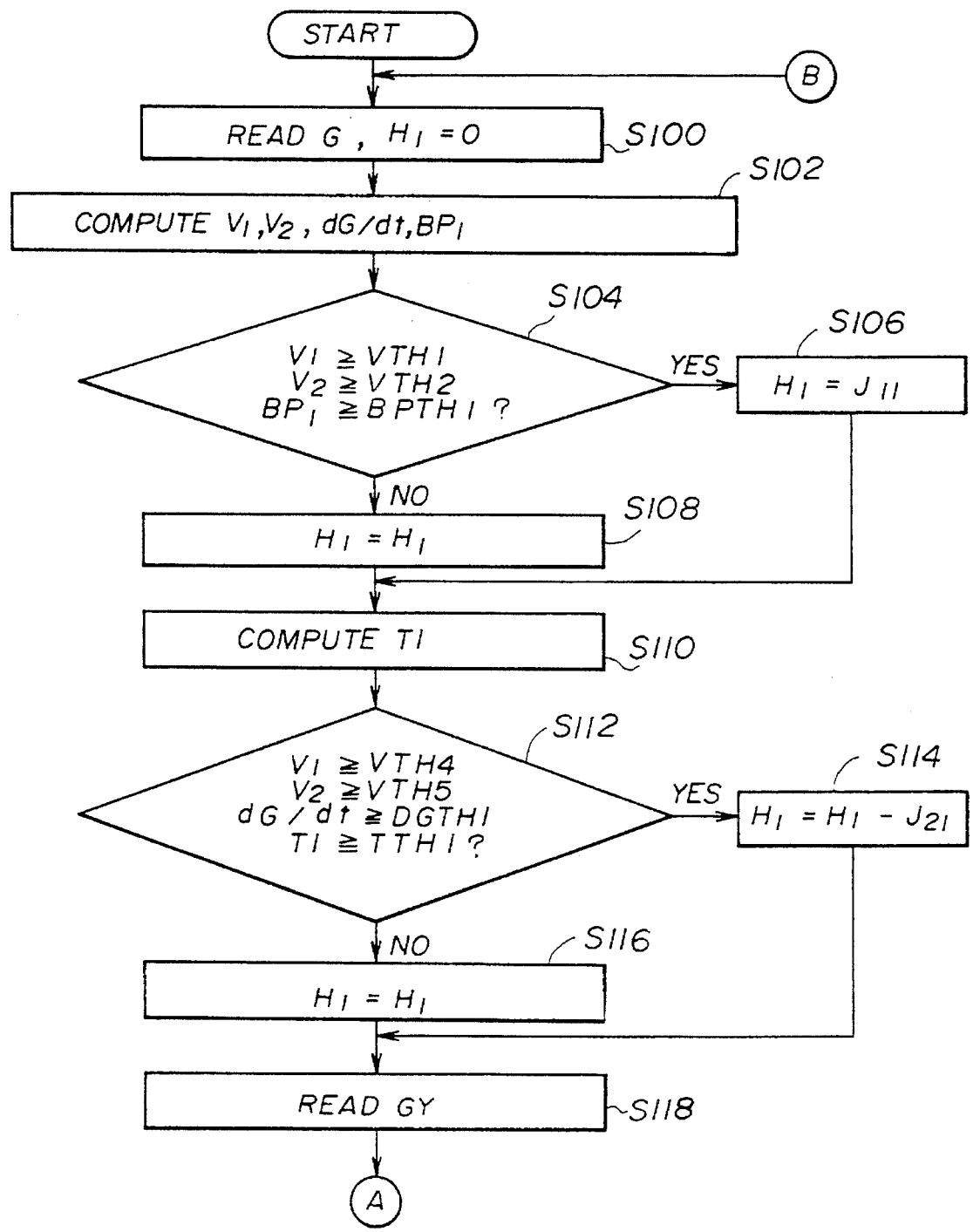
FIG. 10 is a part of flow chart of a first embodiment of a control operation of an air bag control system according to the present invention.
Figure 11:
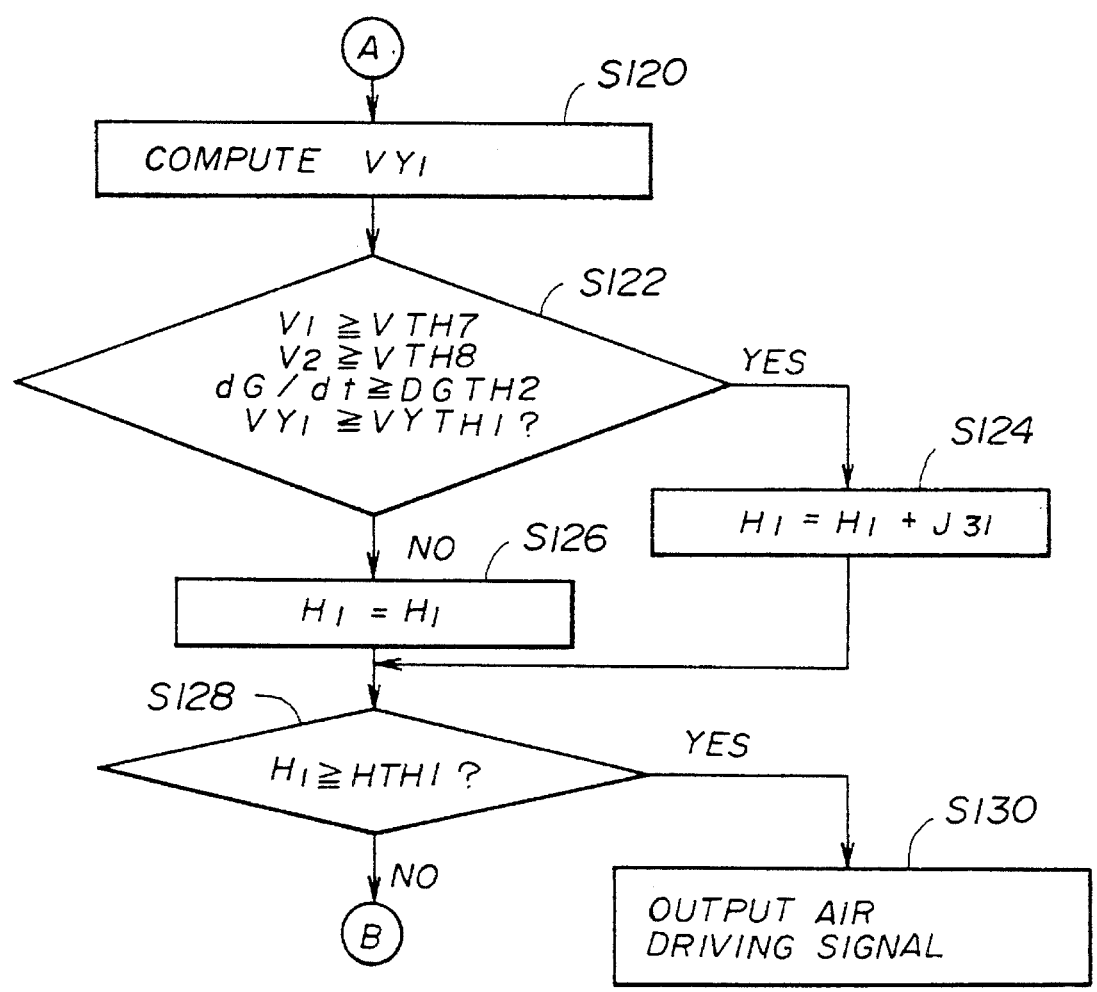
FIG. 11 is a part of flow chart of a first embodiment of a control operation of an air bag control system according to the present invention.

A control operation process shown in FIG. 10 and FIG. 11 is a routine executed in a very short time after an occurrence of a collision has been detected. The control operation process is executed in real-time as the time collision occurs is not predictable.

When the procedure is started, first, in step 100 (hereinafter "step" is abbreviated as "S"), the acceleration G is read from the longitudinal acceleration sensor 14, and a judging value $H_1$ (described in the following) is cleared to zero. In S102, a post-collision speed $V_1$, a degree of acceleration $V_2$, a rate of change $dG/dt$ and a scale of collision $BP_1$ are computed by using the acceleration G. These values are obtained by the following equations.

$$V_1 = \int_{t-TW1}^{t} G dt \quad (1)$$

$$V_2 = \int_{t-TW2}^{t} G dt \quad (2)$$

$$(dG/dt) = (F_1 - F_2)/K_1 \quad (3)$$

$$F_1 = \int_{t-TW3}^{t} G dt \quad (4)$$

$$F_2 = \int_{t-2TW3}^{t-TW3} G dt \quad (5)$$

t0 in the above equations represents a time when the routine shown in FIG. 10 and FIG. 11 is started. In the above equation (1), TW1 is set to, for example, 150 ms, and thus the post-collision speed $V_1$ represents an integral of the acceleration G during the period of time of a collision under normal conditions.

On the other hand, TW2 in the above equation (2) is set to, for example, 10 ms, and thus the degree of acceleration $V_2$ represents the integral of the acceleration G during a short time. That is, $V_2$ represents a level of acceleration in TW2. It should be noted that the value of $V_2$ can be represented by the mean value of the past n number of values of the acceleration G sampled every predetermined period.

In this embodiment, the post-collision speed $V_1$ and the degree of acceleration $V_2$ are computed separately so that unnecessary inflation of the air bag is prevented such as in the case of a light collision where the degree of acceleration $V_2$ is very low or in the case of driving on a rough road where the post-collision speed $V_1$ is very low.

The scale of collision $BP_1$ is represented by a frequency when the rate of change $dG/dt$ of the acceleration G exceeds a predetermined threshold value GTH1 in a period of time from the time (t-TW1) to the time t. The rate of change $dG/dt$ is obtained by the above equation (3). $F_1$ in the equation (3) is the value obtained by the equation (4). $F_2$ is the value obtained by equation (5). In each equation, TW3, which is a predetermined period of time, is set to, for example, 5 ms. Accordingly, the value obtained by equation (4) is the acceleration G for the last 5 ms before starting of the routine, and the value obtained by equation (5) is the acceleration obtained for the period of time from 10 ms before the start of the routine to 5 ms before the start of the routine. In this embodiment, as indicated by equation (3), the rate of change is represented by the difference between the post-collision speeds $F_1$ and $F_2$ divided by a constant $K_1$ (for example, $K_1$ is set to 0.2).

Figure 7B:
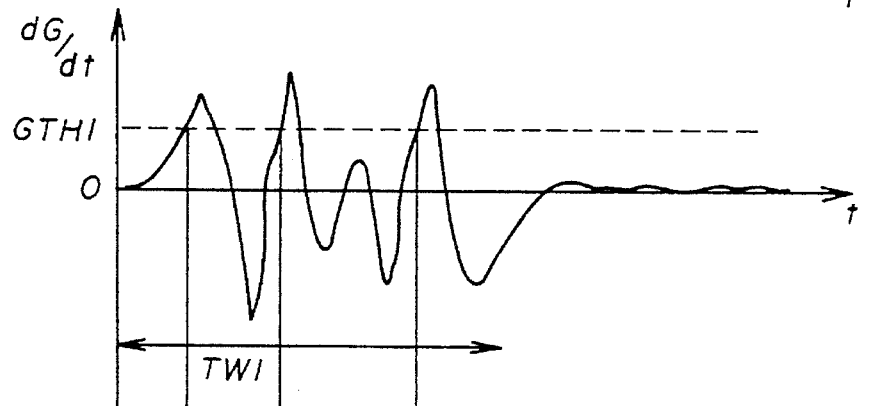
FIG. 7B is a graph showing the rate of change dG/dt of longitudinal acceleration G in a condition where buckling of a side member occurs.

FIG. 7B is a graph showing the rate of change $dG/dt$ of longitudinal acceleration G in the condition where buckling of a side member occurs. Since a side member is deformed in a bellows-like shape in a collision where buckling of a side member occurs, the acceleration G shows a wave-like fluctuation. Due to this, the rate of change $dG/dt$ of the longitudinal acceleration G, which is a differential value of the longitudinal acceleration G shows a large fluctuation. The harder the collision, the greater the number of occurrence of buckling. In other words, larger the fluctuation of the rate of change, the harder the collision. Accordingly, the severity of a collision can be quantitatively represented by means of counting the number of peaks in the wave form of the rate of change $dG/dt$. The number of peaks is equal to the number of buckles occurring in a side member.

Figure 7C:
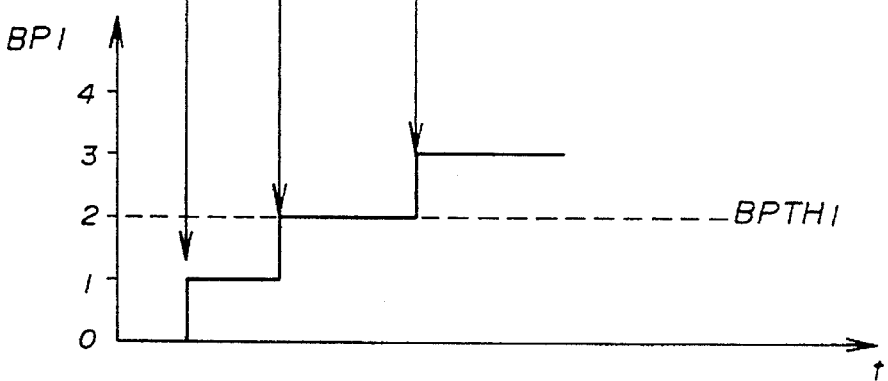
FIG. 7C is a graph for explaining a scale of collision $BP_1$.

In this embodiment, peaks exceeding the predetermined threshold value GTH1 are counted and the resultant number represents the scale of collision $BP_1$. FIG. 7C is a graph for explaining the scale of collision $BP_1$. In the condition shown in FIG. 7B, since the number of peaks exceeding the threshold value GTH1 are three, the scale of collision $BP_1$ is set as $BP_1=3$.

After $V_1$, $V_2$, $dG/dt$ and $BP_1$ are computed in S102, the routine proceeds to S104. In S104, it is judged whether or not a fluctuation of an acceleration in a longitudinal direction (refer to FIG. 6) has been occurring by judging whether or not the following conditions are established.

First condition . . . $BP_1 \geq BPTH1$

Second condition . . . $V_1 \geq VTH1$

Third condition . . . $V_2 \geq VTH2$

Where BPTH1, VTH1 and VTH2 are threshold values for the necessity of inflation of an air bag obtained by experiment.

In a judgment of the above first condition, it is judged whether or not the scale of collision $BP_1$ is greater than the predetermined threshold value BPTH1. As mentioned above, the scale of collision $BP_1$ becomes a large number in the case of a collision accompanied by buckling of a side member. The CPU 18 judges that the first condition is established when the scale of collision $BP_1$ is greater than the threshold value BPTH1.

Similarly, in judgments of the second and the third conditions, it is judged whether or not the post-collision speed $V_1$ is greater than the threshold value VTH1 and whether or not t, he degree of acceleration is greater than the threshold value VTH2. It can be judged whether or not a collision accompanied by buckling of a side member has occurred by observing whether or not the first condition is established. Since the scale of collision $BP_1$ is computed by using the fluctuation of the acceleration G, $BP_1$ may become large due to other conditions such as driving on a rough road or a light collision where inflation of an air bag is not needed. This embodiment includes the second and the third conditions in addition to the first condition so as to eliminate undesired factors other than the factors necessary for an inflation of an air bag.

In S104, if it is judged that the first to the third conditions are established, the routine proceeds to S106. In S106, a predetermined weighting value $J_{11}$ is added to the judging value $H_1$ and the added value is set as the new judging value $H_1$. On the other hand, if it is judged that one of the first to the third conditions is not established, the routine proceeds to S108 where $H_1$ is not changed and then proceeds to the next step.

In S110, a time T1 (hereinafter called collision time T1), which is a period of time when $V_2$ exceeds the threshold value VTH3 during the predetermined period of time TW1, is computed by using $V_2$ obtained by the process in S102.

Figure 8B:
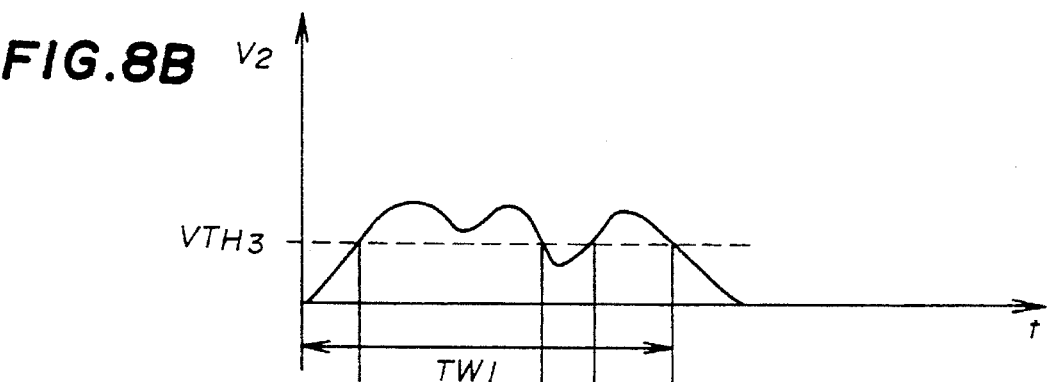
FIG. 8B is a graph showing an example of the rate of change of an acceleration $V_2$ in a condition where bending of a side member or deformation of a weak portion occurs.
Figure 8C:
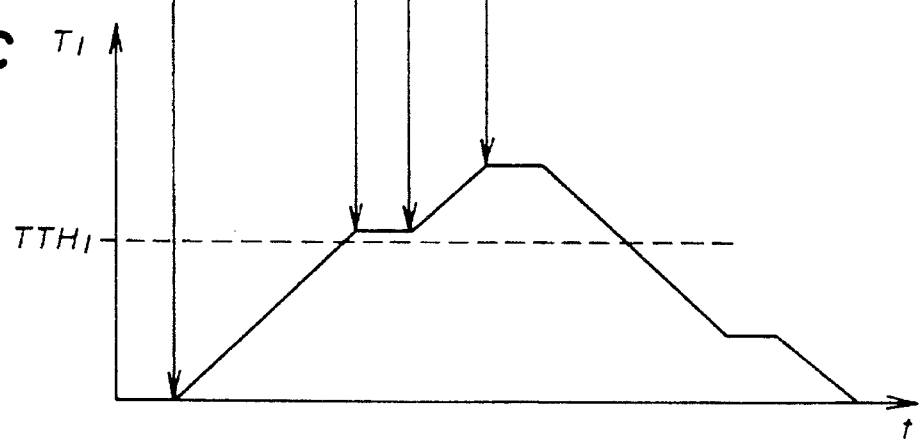
FIG. 8C is a graph explaining a collision time T1.

FIG. 8B is a graph showing an example of rate of change of an acceleration $V_2$ in a condition where bending of a side member or deformation of a weak portion occurs. As mentioned above, in a condition where a crash of an automobile lasts for relatively long time such as a front collision or an under-ride collision, the acceleration $V_2$ remains above a certain constant value for a relatively long time. Accordingly, the collision time T1 is considered one of the parameters indicating the collision mode. In S110, this collision time T1 is computed. It should be noted that the collision time T1 corresponding to the condition shown in FIG. 8B is shown in FIG. 8C. The above collision time T1 is, for example, computed by means of a comparator and a timer included in the CPU18.

In next S112, it is judged whether or not the following four conditions are established. The process in S112 is for judging whether or not a gentle fluctuation of longitudinal acceleration occurs (refer to FIG. 6).

First condition ... $T_1 \geq TTH1$

Second condition ... $V_1 \geq VTH4$

Third condition ... $V_2 \geq VTH5$

Fourth condition ... $(dG/dt) \geq DGTH1$

Where TTH1, VTH4, VTH5 and DGTH1 are threshold values for determining the necessity of inflation of an air bag obtained by experiment.

In a judgment of the above first condition, it is judged whether or not the collision time T1 computed in the S110 is greater than the predetermined threshold value TTH1. As mentioned above, the collision time T1 becomes a large number in the case of a collision being accompanied by bending of a side member or deformation of a weak portion. The CPU 18 judges that the first condition is established when the collision time T1 is greater than the threshold value TTH1.

Similarly, in judgments of the second to the fourth conditions, it is judged whether or not the post-collision speed $V_1$ is greater than the threshold value VTH4, whether or not the degree of acceleration is greater than the threshold value VTH5 and whether or not the rate of change dG/dt is greater than the threshold value DGTH1. It can be judged whether or not a collision accompanied by bending of a side member or deformation of a weak portion has occurred by observing whether or not the first condition is established. As explained with the process executed by S104 the collision time T1 may become large due to other conditions such as driving on a rough road or a light collision where inflation of an air bag is not needed. This embodiment includes the second to the fourth conditions in addition to the first condition so as to eliminate undesired factors other than the factors necessary for inflation of an air bag.

In S112, if it is judged that the first to the fourth conditions are established, the routine proceeds to S114. In S114, a predetermined weighting value $J_{21}$ is added to judging value $H_1$ and the added value is set as the new judging value $H_1$. If the test performed by S104 was positive and $J_{11}$ was added to $H_1$ in S106, the judging value $H_1$ renewed in S114 is set as $H_1=J_{11}+J_{21}$. On the other hand, if it is judged that one of the first to the fourth conditions is not established in the S112, the routine proceeds to S116 where $H_1$ is not changed and then proceeds to the next step.

In S118, the transverse acceleration GY supplied by the transverse acceleration sensor 15 is read. In the next step S120, the transverse post-collision speed $VY_1$ is computed by the following equation by using the transverse acceleration GY.

$$VY_1 = \left| \int_{t-TW1}^{t} GY dt \right| \tag{6}$$

It should be noted that the transverse post-collision speed $VY_1$ is represented by the absolute value of the integrated value of the transverse acceleration GY in the above equation (6) because unlike the longitudinal acceleration, both the left and right directions must be considered for the transverse acceleration.

In the next step S122, it is judged whether or not the following four conditions are established. The tests in S122 is for judging whether or not a fluctuation of transverse acceleration has occurred. (refer to FIG. 6).

First condition ... $VY_1 \geq VYTH1$

Second condition ... $V_1 \geq VTH7$

Third condition ... $V_2 \geq VTH8$

Fourth condition ... $(dG/dt) \geq DGTH2$

Where VYTH1, VTH7, VTH8 and DGTH2 are threshold values for determining the necessity of inflation of an air bag obtained by experiment.

In a judgment of the above first condition, it is judged whether or not the transverse post-collision speed $VY_1$ computed in the S120 is greater than the predetermined threshold value VYTH1. As explained with reference to FIG. 6, the transverse collision acceleration GY is generated in the case of a collision being an offset collision or a slanting collision. Accordingly, the transverse post-collision speed $VY_1$, which is an integral of the transverse acceleration GY, is considered one of the parameters indicating the collision mode. The CPU 18 judges that the first condition is established when the collision time T1 is greater than the threshold value TTH1.

Similarly, in judgments of the second to the fourth conditions, it is judged whether or not the post-collision speed $V_1$ is greater than the threshold value VTH7, whether or not the degree of acceleration $V_2$ is greater than the threshold value VTH8 and whether or not the rate of change dG/dt is greater than the threshold value DGTH2. This, also, is for eliminating undesired factors other than the factors necessary for an inflation of an air bag. It should be noted that FIG. 9B is a graph showing the transverse post-collision speed $VY_1$ in a condition where the transverse acceleration shows the fluctuation shown in FIG. 9A.

In S122, if it is judged that the first to the fourth conditions are established, the routine proceeds to S124. In S124, a predetermined weighting value $J_{31}$ is added to judging value $H_1$ and the added value is set as the new judging value $H_1$. If the processes executed by the S104 and S112 were positive and $J_{11}$ and $J_{21}$ were added to $H_1$, the judging value $H_1$ renewed in S124 is set as $H_1=J_{11}+J_{21}+J_{31}$. On the other hand, if it is judged that one of the first to the fourth conditions is not established in the S122, the routine proceeds to S126 where $H_1$ is not changed and then proceeds to the next step.

In S128, it is judged whether or not the judging value $H_1$ is greater than a predetermined threshold value HTH1. If it is judged that the $H_1$ is greater than HTH1 in S128, the routine proceeds to S130. In S130, the CPU 18 sends the air bag driving signal to the air bag driving apparatus 12 so as to inflate the air bag.

In this embodiment, the air bag driving signal is output when the judging value $H_1$ is greater than the threshold value HTH1. The judging value $H_1$ is a value to which the weighting values, respectively corresponding to the features of the output from the acceleration sensors, $J_{11}$, $J_{21}$ and $J_{31}$ are added. This weighting is applied because most actual collisions are complex such that a plurality of features output from the acceleration sensors explained with reference to FIG. 6 are detected in one collision.

By outputting the air bag driving signal based on the judgment performed by using properly determined weighting values $J_{11}$, $J_{21}$ and $J_{31}$, the air bag can be inflated at an appropriate timing and an improved accuracy of operation of the air bag is obtained.

Additionally, in this embodiment, the collision can be accurately detected by having only two acceleration sensors. Therefore, the number of sensors and related processing circuits can be reduced compared to the conventional system which recognizes the five collision modes by using corresponding five kinds of sensors, and thus manufacturing cost is reduced. It should be noted that, as apparent from the above description, this embodiment has a capability equivalent to that of a collision detection system for five collision modes.

Next, a description will be given of a second embodiment of a control operation of an air bag executed by the CPU 18 with reference to FIG. 12. Since the second embodiment of a control operation has many processes in common with the first embodiment mentioned above, a description will be given of mainly the differences between the first and the second embodiments.

Figure 12:
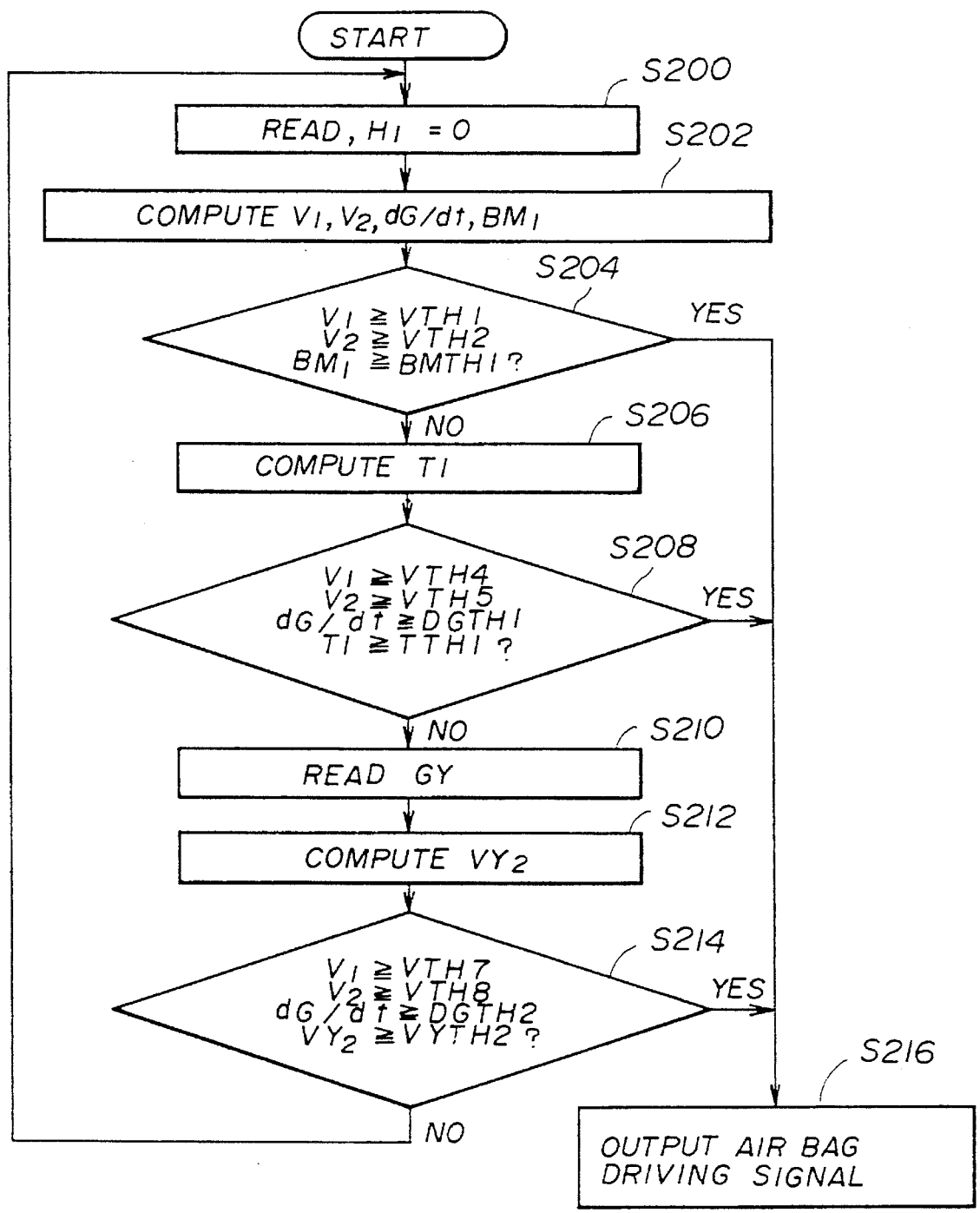
FIG. 12 is a flow chart of a second embodiment of a control operation of air bag control system according to the present invention.

When the routine shown in FIG. 12 is started, in S200, the acceleration is read from the longitudinal acceleration sensor 14. In the following S202, a post-collision speed $V_1$, a degree of acceleration $V_2$, a rate of change dG/dt of the acceleration G and a scale of collision $BM_1$ are computed by using the acceleration G. These values are obtained by the above equations (1) to (5), and the scale of collision is obtained by the following equation.

$$BM_1 = \sum_{i=1}^{n} \int_{t_{0i}}^{t_{1i}} (dG/dt)dt \qquad (7)$$

The scale of collision $BM_1$ is represented by the area of the hatched portions shown in FIG. 13A. That is, $BM_1$ is represented by an integrated of the rate of change dG/dt in the regions where the rate of change dG/dt exceeds a predetermined threshold value GTH2. In the example shown in FIG. 13A, the region for the integration is the time $t_{01}$ to $t_{11}$, the time $t_{02}$ to $t_{12}$ and the time $t_{03}$ to $t_{13}$. Therefore, the scale of collision is represented by the sum of the integrated values of the rate of change dG/dt for the above regions. FIG. 13B is a graph showing the scale of collision in a condition where the rate of change shows the characteristic shown in FIG. 13A.

Now, the scale of collision $BM_1$ and the scale of collision $BP_1$ of the first embodiment explained with reference to FIG. 7B and FIG. 7C are compared. The scale of collision $BP_1$ is, as shown in FIG. 7b and FIG. 7C, a counted value of the peaks of the rate of change dG/dt that exceed the predetermined threshold value GTH1. Each of the peaks is counted as one peak regardless of its height. Therefore, the scale of collision $BP_1$ is considered as not always accurately reflecting the severity of a collision.

On the other hand, since the scale of collision $BM_1$ obtained in this embodiment is an integrated value of the rate of change dG/dt in a region where the rate of change dG/dt exceeds a predetermined threshold value GTH2, the scale of collision $BM_1$ sufficiently reflects the severity of a collision. In the example shown in FIG. 13A, $BP_1$ becomes 3 as the rate of change dG/dt exceeds the threshold value GTH2 three times. However, the form of peaks exceeding the threshold value is not uniform in its height as well as its width. For example, the area of one peak indicated by an arrow A is smaller than that of other peaks indicated by arrows B and C.

FIG. 13B is a graph showing the change of the scale of collision $BM_1$ in a condition where the rate of change dG/dt shows the fluctuation shown in FIG. 13A. As shown in the figure, the increase of the scale of collision $BM_1$ corresponding the peaks B and C is greater than that of the peak A. Accordingly, the scale of collision $BM_1$ of this embodiment reflects the scale of peaks (correspond to severity of a collision) and that enables it to accurately detect severity of a collision.

Returning to FIG. 12, the description of the control operation of an air bag is continued. After computing the post-collision speed $V_1$, the degree of acceleration $V_2$, the rate of change dG/dt of the acceleration G and the scale of collision $BM_1$ in S202, the routine proceeds to S204, and it is judged whether or not the following conditions are established. Similar to S104, the process in S204 is for judging whether or not a fluctuation of longitudinal acceleration has occurred (refer to FIG. 6).

First condition . . . $BM_1 \geq BMTH1$

Second condition . . . $V_1 \geq VTH1$

Third condition . . . $V_2 \geq VTH2$

Where BMTH1, VTH1 and VTH2 are threshold values for determining the necessity of inflation of an air bag obtained by experiment.

In a judgment of the above first condition, it is judged whether or not the scale of collision $BM_1$ is greater than the predetermined threshold value BMTH1. As explained in the above, the scale of collision $BM_1$ is a value more accurately reflecting severity of a collision compared to the scale of collision $BP_1$ of the first embodiment. Accordingly, the accuracy of judgment can be improved in the second embodiment, and a high accuracy of timing for inflation of an air bag is obtained. The second and the third conditions are the same as that in the first embodiment, and a description thereof will be omitted.

If it is judged that the first to the third conditions are established in S204, the routine proceeds to S216. In S216, the CPU 18 immediately outputs an air bag driving signal to the air bag driving apparatus 12. On the other hand, if it is judged that at least one of the above three conditions is not established, the routine proceeds to S206.

In S206, the collision time T1 is computed and then the routine proceeds to S208. In S 208, it is judged whether or not the following four conditions are established. Similarly to S112, the tests in S208 is for judging whether or not a gentle fluctuation of longitudinal acceleration occurs (refer to FIG. 6).

First condition . . . $T_1 \geq TTH1$

Second condition . . . $V_1 \geq VTH4$

Third condition . . . $V_2 \geq VTH5$

Fourth condition . . . $(dG/dt) \geq DGTH1$

Where TTH1, VTH4, VTH5 and DGTH1 are threshold values for determining the necessity of inflation of an air bag obtained by experiment.

In S208, if it is judged that the first to the fourth conditions are established, the routine proceeds to S218 and an air bag driving signal is output from the CPU 18 to the air bag driving apparatus 12. On the other hand, if it is judged that at least one of the first to the fourth conditions is not established, the routine proceeds to S210.

In S210, the transverse acceleration GY supplied by the transverse acceleration sensor 15 is read. In the next step S212, the transverse post-collision speed $VY_2$ is computed by the following equation by using the transverse acceleration GY.

$$VY_2 = \text{Max} \left\{ \left| \int_{t-TW1}^{t} GY dt \right| \right\} \quad (8)$$

It should be noted that "Max" in the above equation means that $VY_2$ is represented by the maximum value of the integral of the transverse acceleration GY in a predetermined period of time TW4, for example 30 ms. As shown in FIG. 9B, the transverse post-collision speed $VY_1$ is affected by an acceleration GY in a negative direction that results in decrease of $VY_1$ as indicated by an arrow A in FIG. 9B. However, by taking the maximum value as in the equation (8), a fluctuation of the transverse post-collision speed $VY_2$ caused by a negative acceleration can be eliminated. Accordingly, the transverse post-collision speed $VY_2$ shows a properly stable characteristic which enables it to match the other judging conditions.

After the transverse post-collision speed $VY_2$ is computed in S212, the routine proceeds to S214 where it is judged whether or not the following four conditions are established. The tests in S214 is for judging whether or not a fluctuation of transverse acceleration has occurred. (refer to FIG. 6).

First condition . . . $VY_2 \geq VYTH2$

Second condition . . . $V_1 \geq VTH7$

Third condition . . . $V_2 \geq VTH8$

Fourth condition . . . $(dG/dt) \geq DGTH2$

Where VYTH2, VTH7, VTH8 and DGTH2 are threshold values for determining the necessity of inflation of an air bag obtained by experiment.

In S214, if it is judged that the first to the fourth conditions are established, the routine proceeds to S216. In S216, an air bag driving signal is immediately output from the CPU 18 to the air bag driving apparatus 12. On the other hand, if it is judged that at least one of the first to the fourth conditions is not established, the routine returns to S200 and then the execution of S200 to S214 will be repeated.

In this embodiment, if a positive judgment is made in either S204, S208 or S214, the routine directly proceeds to S216 and an air bag driving signal is output immediately. By this process, the number of steps is reduced and a software program can be simplified, which results in reduced processing time. As is well known, the allowable time for inflating an air bag is very short and the decision whether or not to inflate the air bag must be made in an even shorter time. Therefore, by simplifying the processing time of a control operation of an air bag, an inflation of an air bag can be performing in minimal time.

It should be noted that although the accuracy of judgment for inflation of an air bag is considered to be lowered in comparison to the first embodiment mentioned above, the accuracy remains at an allowable level for an actual use by appropriately setting the scale of collision $BM_1$, the transverse post-collision speed $VY_2$ and the threshold values used in S204, S208 and S214.

Next, a description will be given of a third embodiment of a control operation of an air bag executed by the CPU 18 with reference to FIG. 14. Since the third embodiment of a control operation has many processes in common with the first embodiment mentioned above, a description will be given of mainly the differences between the first and the third embodiments.

Figure 14:
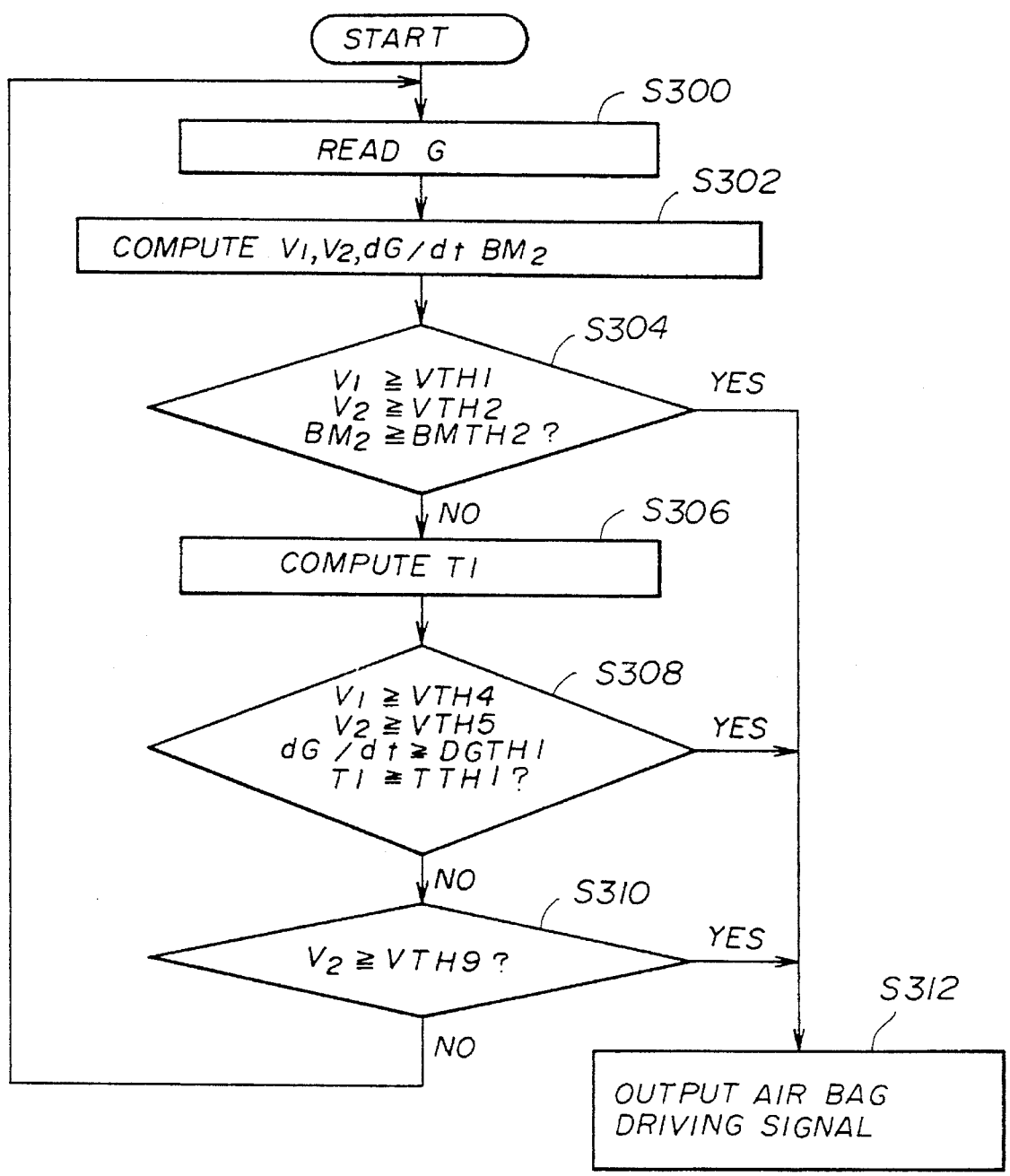
FIG. 14 is a flow chart of a control operation of an air bag control system according to the present invention.

When the routine shown in FIG. 14 is started, in S300, the acceleration G is read from the longitudinal acceleration sensor 14. In the following S302, a post-collision speed $V_1$, a degree of acceleration $V_2$, a rate of change $dG/dt$ of the acceleration G and a scale of collision $BM_2$ are computed by using the acceleration G. These values are obtained by the above equations (1) to (5), and the scale of collision $BM_2$ is obtained by the following equation.

$$BM_2 = \sum_{i=1}^{n} \int_{t_{0i}}^{t_{1i}} \{(dG/dt) - GTH3\} dt \quad (9)$$

Figures 15A, 15B:
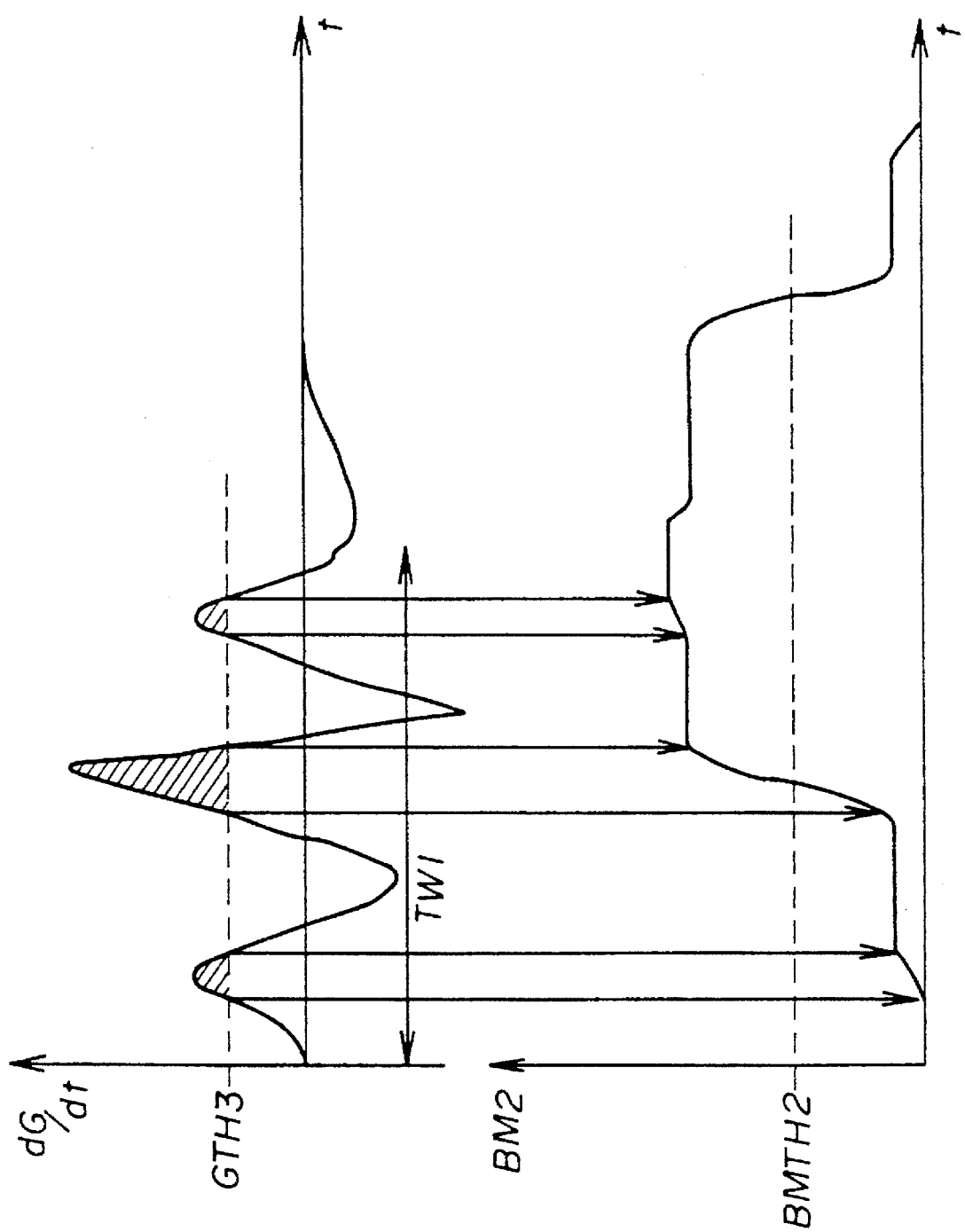
FIG. 15B is a graph showing the scale of collision $BM_2$ in a condition where the rate of change shows a characteristic shown in FIG. 15A.

The scale of collision $BM_2$ is represented by the area of the hatched portions shown in FIG. 15A. That is, $BM_2$ is represented by the sum of the areas of peaks of the rate of change $dG/dt$ exceeding the threshold value GTH3. The scale of collision $BM_2$ is considered to be a quantitative value of severity of a collision that exceeds a predetermined value determined by the threshold value GTH3. Accordingly, The scale of collision $BM_2$ reflects a feature of a collision further than the scale of collision $BP_1$ of the first embodiment and $BM_1$ of second embodiment and that enables it to accurately judge whether or not a collision has occurred. FIG. 15B is a graph showing the scale of collision $BM_2$ in a condition where the rate of change shows the characteristic shown in FIG. 15A.

Returning to FIG. 14, the description of the control operation of an air bag is continued. After computing the post-collision speed $V_1$, the degree of acceleration $V_2$, the rate of change $dG/dt$ of the acceleration G and the scale of collision $BM_2$ in S302, the routine proceeds to S304, and it is judged whether or not the following conditions are established. Similar to S104, the process in S304 is for judging whether or not a fluctuation of longitudinal acceleration has occurred (refer to FIG. 6).

First condition . . . $BM_2 \geq BMTH2$

Second condition . . . $V_1 \geq VTH1$

Third condition . . . $V_2 \geq VTH2$

Where BMTH1, VTH1 and VTH2 are threshold values for determining the necessity of inflation of an air bag obtained by experiment.

In a judgment of the above first condition, it is judged whether or not the scale of collision $BM_2$ is greater than the predetermined threshold value $BMTH2$. As explained in the above, the scale of collision $BM_2$ is a value more accurately reflecting a feature of a collision than the scale of collision $BP_1$ of the first embodiment and the scale of collision $BM_1$ of the second embodiment. Accordingly, the accuracy of judgment can be further improved in the third embodiment. The second and the third conditions are the same as that in the first embodiment, and a description thereof will be omitted.

If it is judged that all of the first to the third conditions are established in S304, the routine proceeds to S312. In S312, the CPU 18 immediately outputs an air bag driving signal to the air bag driving apparatus 12. On the other hand, if it is judged that at least one of the above three conditions is not established, the routine proceeds to S306.

In S306, the collision time T1 is computed and then the routine proceeds to S308. In S308, it is judged whether or not the following four conditions are established. Similarly to S112, the tests in S308 are for judging whether or not a gentle fluctuation of longitudinal acceleration occurs (refer to FIG. 6).

First condition . . . $T_1 \geq TTH1$

Second condition . . . $V_1 \geq VTH4$

Third condition . . . $V_2 \geq VTH5$

Fourth condition . . . $(dG/dt) \geq DGTH1$

Where TTH1, VTH4, VTH5 and DGTH1 are threshold values for determining the necessity of inflation of an air bag obtained by experiment.

In S208, if it is judged that the first to the fourth conditions are established, the routine proceeds to S312 and an air bag driving signal is output from the CPU 18 to the air bag driving apparatus 12. On the other hand, if it is judged that at least one of the first to the fourth conditions is not established, the routine proceeds to S310.

In S310, it is judged whether or not the degree of acceleration $V_2$ is greater than a predetermined threshold value VTH9. The tests executed by S310 are mainly for detecting the pole collision or the offset collision where a rapid increase of the longitudinal acceleration is generated.

The slanting collision and the offset collision can be recognized by not only observing the transverse acceleration GY but also observing a gentle fluctuation of longitudinal acceleration G (refer to FIG. 6). The purpose of the tests in S310 are to reduce a load on S308 and S304. By performing this test, the front collision and the pole collision can be separated from other collision modes and thus objects of decisions made by S304 and S308 can be focused on the slanting collision, the offset collision and the under-ride collision. Therefore, further processed data can be used in the judgment process executed by S304 and S308 and thus the air bag control system according to this embodiment can be constructed by using only one acceleration sensor.

If the judgment is positive in S310, the routine proceeds to 8312 and an air bag driving signal is immediately output from the CPU 18 to the air bag driving apparatus 12. On the other hand, if the judgment in S310 is negative, the routine returns to S300 and thus repeats the process from S300 to S310.

In this embodiment, similarly to the second embodiment, if a positive judgment is made in either 8304, 8308 or S310, the routine directly proceeds to S312 and an air bag driving signal is output immediately. By this process, the number of steps is reduced and a software program can be simplified, which results in reduced processing time, and thus an inflation of air bag can be performed without delay.

Additionally, in this embodiment, only one sensor, which is a longitudinal acceleration sensor 14, is used to recognize the five collision modes shown in FIG. 1. Therefore, the number of sensors can be reduced and thus manufacturing cost is reduced.

the present invention is not limited to the specifically disclosed embodiments, and variations and modifications may be made without departing from the scope of the present invention.

What is claimed is:

1. An air bag system comprising:

an air bag driving apparatus including an air bag and means for inflating said air bag upon receipt of an air bag driving signal; and an air bag control system comprising:

a first acceleration sensor which detects an acceleration of the body of an automobile in a longitudinal direction and outputs a first acceleration signal, an acceleration level computing means, coupled to said first acceleration sensor, for computing a degree of acceleration and a longitudinal post-collision speed by using said first acceleration signal, a rate of change computing means, coupled to said first acceleration sensor, for computing the rate of change of said first acceleration signal and detecting a predetermined characteristic of said rate of change, and outputting first resultant data, a first judging means, coupled to said acceleration level computing means and said rate of change computing means, for judging an occurrence of a collision of said automobile by using said degree of acceleration, said longitudinal poet-collision speed and said first resultant data, and outputting a first judgment result, a second judging means, coupled to said acceleration level computing means, for computing a period of time during which said degree of acceleration exceeds a predetermined value and judging an occurrence of a collision of said automobile by using said degree of acceleration, said longitudinal post-collision speed, said rate of change when said period of time exceeds a predetermined value, and outputting a second judgment result, and an air bag driving signal outputting means, coupled to said first and said second judging means, for determining an occurrence of a collision of said automobile based on said first and said second judgment results and outputting said air bag driving signal to said air bag driving apparatus.

2. The air bag system as claimed in claim 1, wherein said predetermined characteristic detected by said rate of change computing means comprises a value representing the integral of said rate of change over a period of time during which said rate of change exceeds a predetermined value.

3. The air bag system as claimed in claim 1, wherein said first judging means judges that a collision has occurred when all of said degree of acceleration, said longitudinal post-collision speed and said predetermined characteristic of said rate of change are greater than respective predetermined values.

4. The air bag system as claimed in claim 1, wherein said second judging means judges that a collision has occurred when all of said degree of acceleration, said longitudinal post-collision speed, said rate of change and said period of time are greater than respective predetermined values.

5. The air bag system as claimed in claim 1, wherein said air bag driving signal outputting means outputs said air bag driving signal upon receipt of either said first judgment result or said second judgment result.

6. The air bag system as claimed in claim 1, wherein said air bag control system further comprises a deceleration judging means, coupled to said acceleration level computing means and said air bag driving signal outputting means, for judging an occurrence of a collision of said automobile by observing whether or not said longitudinal post-collision speed exceeds a predetermined value and outputting a post-collision speed judgment result, and said air bag driving signal outputting means determines the occurrence of a collision of said automobile based on said first and said second judgement results and said post-collision speed judgment result.

7. An air bag system comprising:

an air bag driving apparatus including an air bag and means for inflating said air bag upon receipt of an air bag driving signal; and an air bag control system comprising, a first acceleration sensor which detects an acceleration of the body of an automobile in a longitudinal direction and outputs a first acceleration signal, an acceleration level computing means, coupled to said first acceleration sensor, for computing a degree of acceleration and a longitudinal post-collision speed by using said first acceleration signal, a rate of change computing means, coupled to said first acceleration sensor, for computing the rate of change of said first acceleration signal and detecting a predetermined characteristic of said rate of change, and outputting first resultant data, wherein said predetermined characteristic detected by said rate of change computing means comprises the number of peaks of a rate of change waveform defined by said rate of change of said first acceleration signal exceeding a predetermined value, a first judging means, coupled to said acceleration level computing means and said rate of change computing means, for judging an occurrence of a collision of said automobile by using said degree of acceleration, said longitudinal post-collision speed and said first resultant data, and outputting a first judgment result, a second judging means, coupled to said acceleration level computing means, for computing the period of time during Which said degree of acceleration exceeds a predetermined value for a first predetermined period of time and judging an occurrence of a collision of said automobile by using said degree of acceleration, said longitudinal post-collision speed, said rate of change and said period of time, and outputting a second judgment result, and an air bag driving signal outputting means, coupled to said first and said second judging means, for determining an occurrence of a collision of said automobile based on said first and said second judgment results and outputting said air bag driving signal to said air bag driving apparatus, 8. An air bag system comprising:

an air bag driving apparatus including an air bag and means for inflating said air bag upon receipt of an air bag driving signal; and an air bag control system comprising:

a first acceleration sensor which detects an acceleration of the body of an automobile in a longitudinal direction and outputs a first acceleration signal, an acceleration level computing means, coupled to said first acceleration sensor, for computing a degree of acceleration and a longitudinal post-collision speed by using said first acceleration signal, a rate of change computing means, coupled to said first acceleration sensor, for computing the rate of change of said first acceleration signal and detecting a predetermined characteristic of said rate of change, and outputting first resultant data, wherein said predetermined characteristic detected by said rate of change computing means comprises a value representing the area of the peaks of a rate of change waveform defined by said rate of change of said first acceleration signal exceeding a predetermined value for a first predetermined period of time, a first judging means, coupled to said acceleration level computing means and said rate of change computing means, for judging an occurrence of a collision of said automobile by using said degree of acceleration, said longitudinal post-collision speed and said first resultant data, and outputting a first judgment result, a second judging means, coupled to said acceleration level computing means, for computing the period of time during which said degree of acceleration exceeds a predetermined value and judging an occurrence of a collision of said automobile by using said degree of acceleration, said longitudinal post-collision speed, said rate of change and said period of time, and outputting a second judgment result, and an air bag driving signal outputting means, coupled to said first and said second judging means, for determining an occurrence of a collision of said automobile based on said first and said second judgment results and outputting said air bag driving signal to said air bag driving apparatus.

9. An air bag system comprising:

an air bag driving apparatus including an air bag and means for inflating said air bag upon receipt of an air bag driving signal; and an air bag control system comprising, a first acceleration sensor which detects an acceleration of the body of an automobile in a longitudinal direction and outputs a first acceleration signal, an acceleration level computing means, coupled to said first acceleration sensor, for computing a degree of acceleration and a longitudinal post-collision speed by using said first acceleration signal, a rate of change computing means, couples to said first acceleration sensor, for computing the rate of change of said first acceleration signal and detecting a predetermined characteristic of said rate of change, and outputting first resultant data, a first judging means, coupled to said acceleration level computing means and said rate of change computing means, for judging an occurrence of a collision of said automobile by using said degree of acceleration, said longitudinal post-collision speed and said first resultant data, and outputting a first judgment result, a second judging means coupled to said acceleration level computing means, for computing the period of time during which said degree of acceleration exceeds a predetermined value for a first predetermined period of time and judging an occurrence of a collision of said automobile by using said degree of acceleration, said longitudinal post-collision speed, said rate of change and said period of time, and outputting a second judgment result, an air bag driving signal outputting means, coupled to said first and said second judging means, for determining an occurrence of a collision of said automobile based on said first and said second judgment results and outputting said air bag driving signal to said air bag driving apparatus, and a weighing means for weighing said first judgment result and said second judgment result with respective predetermined weighing factors, and said air bag driving signal outputting means determines that a collision has occurred when the sum of said weighted first judgment result and weighted second judgment result exceeds a predetermined value.

10. An air bag system comprising:

an air bag driving apparatus including an air bag and means for inflating said air bag upon receipt of an air bag driving signal; and an air bag control system comprising:

a first acceleration sensor which detects an acceleration of the body of an automobile in a longitudinal direction and outputs a first acceleration signal, an acceleration level computing means, coupled to said first acceleration sensor, for computing a degree of acceleration and a longitudinal post-collision speed by using said first acceleration signal, a rate of change computing means, coupled to said first acceleration sensor, for computing the rate of change of said first acceleration signal and detecting a predetermined characteristic of said rate of change, and outputting first resultant data, a first judging means, coupled to said acceleration level computing means and said rate of change computing means, for judging an occurrence of a collision of said automobile by using said degree of acceleration, said longitudinal post-collision speed and said first resultant data, and outputting a first judgment result, a second judging means, coupled to said acceleration level computing means, for computing the period of time during which said degree of acceleration exceeds a predetermined value for a first predetermined period of time and judging an occurrence of a collision of said automobile by using said degree of acceleration, said longitudinal post-collision speed, said rate of change and said period of time, and outputting a second judgment result, a second acceleration sensor which detects an acceleration in the transverse direction of said body of said automobile and outputs a second acceleration signal, a transverse post-collision speed computing means, coupled to said second acceleration sensor, for computing a transverse post-collision speed by using said second acceleration signal and deriving a factor from said transverse post-collision speed, a third judging means, coupled to said transverse post-collision speed computing means and said acceleration level computing means, for judging the occurrence of a collision of said automobile by using said degree of acceleration, said longitudinal post-collision speed, said range of change and said factor of said transverse post-collision speed, said third judging means outputting a third judgment result, and an bag driving signal outputting means, coupled to said first, said second and said third judging means, for determining an occurrence of a collision of said automobile based on said first, said second and said third judgment results and outputting said air bag driving signal to said air bag driving apparatus.

11. The air bag system as claimed in claim 10, wherein said factor derived from said transverse post-collision speed computed by said transverse post-collision speed computing means comprises a value representing an absolute value of an integration of said transverse post-collision speed for said first predetermined period of time.

12. The air bag system as claimed in claim 10, wherein said factor derived from said transverse post-collision speed computed by said transverse post-collision speed computing means comprises a value representing the maximum value of said transverse post-collision speed for a second predetermined period of time.

13. The air bag system as claimed in claim 10, wherein said third judging means judges that a collision has occurred when all of said degree of acceleration, said longitudinal post-collision speed, said rate of change and said factor of said transverse post-collision speed are greater than respective predetermined values.

14. The air bag system as claimed in claim 10, wherein said air bag driving signal outputting means outputs said air bag driving signal upon receipt of either said first judgment result, said second judgment result or said third judgment result.

15. The air bag system as claimed in claim 10, wherein said air bag control system further comprises a weighting means for weighting said first judgment result, said second judgment result and said third judgment result with respective predetermined weighting factors, said air bag driving signal outputting means determines that a collision has occurred when the sum of said weighted first judgment result, weighted second judgment result, and weighted third judgment result exceeds a predetermined value.

* * * * *